June 12, 1951  B. W. GAMSON  2,556,176
CARBON DISULFIDE PROCESS
Filed April 19, 1948
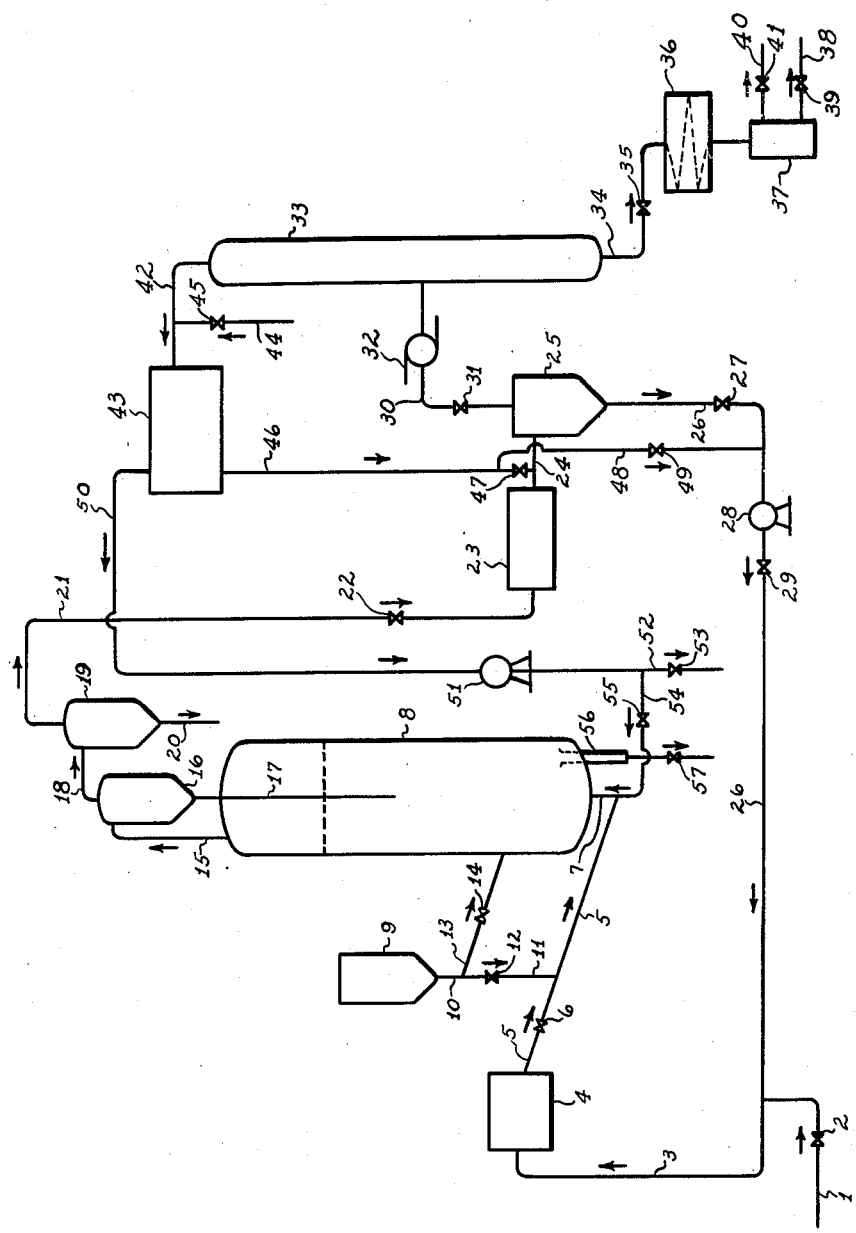
INVENTOR.
BERNARD W. GAMSON
BY Lee J. Gary
ATTORNEY Patented June 12, 1951

2,556,176

UNITED STATES PATENT OFFICE 2,556,176

CARBON DISULFIDE PROCESS

Bernard W. Gamson, Chicago, Ill., assignor to Great Lakes Carbon Corporation, Morton Grove, Ill., a corporation of Delaware Application April 19, 1948, Serial No. 22,020

7 Claims. (Cl. 23—206)

This invention relates to an improved method for producing carbon disulfide from reactive carbon using the so-called fluidized type of reactor.

The conventional process for manufacturing carbon disulfide employs large reactors packed with carbon particles usually larger than ½ inch in cross section. Sulfur vapor is passed through the stationary bed until the carbon has been substantially completely consumed. After this the reactor is opened, cleaned of unconverted carbon, ash, and the like and recharged. This batch type of operation is subject to many disadvantages among which are the tendencies of the carbon to break down into smaller particles which tend to clog the bed and cause shut downs before all of the carbon is used; and the fact that only relatively large pieces of carbon can be employed. The preparation of the carbon in sizes satisfactory for use involves considerable expense and requires a market for the fines.

According to the present invention, carbon varying from about 4 to about 400 mesh can be used, with the preferred range being from about 100 to about 200 mesh. The difficulties due to clogging which are encountered in the stationary bed operation are eliminated.

In one specific embodiment the invention comprises charging sulfur vapor and reactive carbon to a reaction zone, maintaining the carbon in the form of a fluidized bed having a dense phase and a light phase, separating vapors of carbon disulfide, precipitating and returning unconverted carbon to the reaction zone, precipitating and separating finely divided ash, cooling the reaction mixture to condense and separate sulfur therefrom, recycling said sulfur to the process, fractionating the sulfur-free reaction vapors to separate carbon disulfide, subjecting the vapors comprising hydrogen sulfide to a sulfur recovery step, passing the recovered sulfur to the sulfur vaporizer, and, depending upon operating conditions, returning a portion of the exit gases to the reaction zone to assist in maintaining the carbon in fluidized condition.

The process is illustrated in conjunction with the accompanying drawing which is diagrammatic.

Elementary sulfur is introduced through line 1, valve 2, line 3, to vaporizer 4 of any suitable type. The sulfur may be added in any convenient manner either as a solid or as a liquid. The sulfur vapors pass through lines 5, valve 6, to line 7 and thence into reactor 8. A suitable reactive carbonaceous body is introduced from hopper 9, line 10, line 11 and valve 12, passing into line 5 and thence to the reactor 8. Alternatively part or all of the carbon may be passed through line 13 and valve 14 directly to the reactor.

The reactive carbon may be any suitable carbon but should be one which is substantially completely consumable in the process, except for a minor amount of ash that may be present. A low ash carbon is preferred, but the particular procedure permits other carbons of higher ash content to be used.

One highly suitable carbon is prepared according to the process of my co-pending application, 649,730, filed February 23, 1946, now Patent No. 2,447,004. According to this method a uniform mixture of a hydrocarbonaceous material liquid at least in the range of about 300°–450° F. and sulfur is formed. This is converted to a solid, infusible, dense, insoluble, amorphous carbonaceous substance containing carbon, hydrogen and sulfur in chemical combination. Conversion to a solid in the range of about 450°–625° F. which may then be heated further to not more than about 1100° F., gives the carbonaceous material the following chemical composition:

|  | Per cent |
|---|---|
| Carbon | 47 to 70 |
| Hydrogen | 4 to 1.8 |
| Sulfur | 50 to 25 |
| Ash—up to about | 2.5 | having a real density of from about 1.3 to about 1.7. This solid substance, identified as a sulfohydrocarbon, can be prepared either in the form of lumps or small discrete particles depending upon the method employed. By spraying the liquid reaction mixture into a heated zone preferably counter current to rising heated gases, the droplets can be solidified to the small particle sizes suitable for use in the present process. It is also possible to convert the material into sizable lumps which can be crushed to the desired size.

In the present process the sulfo-hydrocarbon can be used directly, but it is preferably further heated to a temperature of about 1200–1800° F. to first reduce its hydrogen content by formation of evolved hydrogen sulfide and produce a material having the following composition.

|  | Per cent |
|---|---|
| Carbon—about | 70 to 93 |
| Hydrogen | 1.8 to 0.3 |
| Sulfur | 25 to 6 |
| Ash—up to about | 2.5 | having a real density of about 1.5 to about 1.9 and which is also an infusible amorphous solid. The sulfur in this solid is completely chemically combined with carbon and hydrogen. This material is identified as a sulfo-carbon and it is preferred that the calcining treatment be not above about 1600° F.

The proportion of sulfur employed in the initial mixture to make the sulfohydrocarbon is of the utmost importance. In order to produce a high yield of carbonaceous solid, that is, to convert at least 85% of the carbon in the hydrocarbonaceous charge material to the solid products described above, it is necessary to use at least 60% of the stoichiometric equivalent of the hydrogen content of said charge material. The preferred sulfur range is about 90-110%. If the charge material originally employed has from about 4-12% of hydrogen, it is possible to convert in excess of 95% of the carbon in the calcined sulfo-carbonaceous product to carbon disulfide and when using the preferred proportions of sulfur for preparing said product, its carbon content is then entirely convertible. It is of great importance in the present invention that the carbon be substantially completely convertible in order to prevent accumulation of unconvertible unreactive carbon in the system.

My sulfo carbons are not only more reactive but are more highly convertible to carbon disulfide than are the best wood chars known. Not only that but my reactive carbon solids are especially resistant to attrition for flow-handling in the present process.

Referring to the drawing, the return of vapor flow in the reactor 8 is usually controlled within the range of about 1-20 linear feet per second and is preferably from about 5-10 feet per second, the velocity being dependent upon a number of factors. The rate is adjusted so that the body of carbonaceous material in the reactor is maintained in an ebullient condition. An examination of the reactor in operation would reveal a dense phase in which the principal part of the carbonaceous material is contained. Above this is a light phase in which a relatively small amount of suspended particles appear. Between the two phases is an inter-face resembling the surface of a boiling liquid. The inter-face or boundary between the dense phase and light phase is indicated in the drawing by the dotted line. The vapors of unreacted sulfur, carbon disulfide, and some hydrogen sulfide pass through line 15 into a cyclone, or other suitable separator 16. This is designed so that the heavier and comparatively larger particles of unreacted carbon are precipitated and returned through line 17 to the reaction zone. Line 17 extends below the inter-face so that the recycled carbon is introduced into the dense phase.

The vapors from cyclone 16 pass through line 18 to a cyclone (or series of cyclones) or other suitable precipitators 19. The major portion of the ash, which may contain small amounts of unreacted carbon in finely divided condition is withdrawn through line 20 and may be discarded. Separators 16 and 19 may comprise a series of separators and are not necessarily limited to the cyclone type. For example, a Cottrell precipitator of the electrical precipitation type may be employed to remove the suspended solids from the vapors.

The solid-free vapors pass through line 21 and valve 22 into a cooler 23 which may be a heat exchanger or a waste heat boiler. It should be remembered that the temperature in reactor 8 is of the order of 1100-1800° F. Hence considerable heat can be salvaged from the effluent gases. In cooler 23 the vapors are cooled sufficiently to condense the sulfur to a liquid condition but should be out of the temperature range where the highly viscous form of sulfur is obtained. This liquified sulfur is passed through line 24 to a separator 25 from which the molten sulfur is withdrawn through line 26, valve 27, pump 28 and valve 29 joining with line 3 and returning to the vaporizer.

The vapors from the separator 25 which may be at a temperature in the neighborhood of about 300° F. are passed through valve 31, line 30, and heat exchanger 32 to fractionator 33. This may comprise one or more fractionating columns. Carbon disulfide is removed through line 34, valve 35, cooler 36, to receiver 37 and is withdrawn through line 38 through valve 39 to storage. The receiver may be vented through line 40 and valve 41.

The gases from fractionator 33 pass through line 42 to a sulfur recovery system diagrammatically shown at 43. Sufficient air or oxygen from line 44 and valve 45 may be mixed with gases to burn the hydrogen sulfide contained therein, to produce elemental sulfur. The sulfur recovery system may be catalytic or non-catalytic, for example using the Claus process. This process is well known and need not be described in detail. The amount of hydrogen sulfide is particularly great when the sulfo-hydrocarbons are used as starting material.

Elemental sulfur may be withdrawn through line 46 and valve 47, joining with line 24 and passing to receiver 25. Alternatively the sulfur may be passed through line 48 and valve 49 joining with line 26 and thus be returned to the vaporizer.

The effluent gas from the sulfur recovery system will contain principally nitrogen and in addition hydrogen sulfide, water vapor, sulfur dioxide, carbon dioxide, etc., and is passed through line 50 and pump 51. A portion or all of this gas may be removed through line 52 and valve 53. A part of the gas may be recycled to the reactor through line 54 and valve 55 joining with line 7 to assist in injecting the sulfocarbon or other reactive carbon in suspension into the reaction zone. The amount of gas that is thus recycled is regulated so as to provide the necessary linear velocity within the reactor itself to permit maintaining a fluidized bed therein.

A portion of the carbonaceous material may be withdrawn continuously or intermittently through line 56 and valve 57. This is particularly useful in the event there is an accumulation of heavy particles in the lower part of the reactor.

The need for a carbonaceous material which is completely convertible to carbon disulfide at the conditions of the reaction can be seen. The light ash is readily removed overhead and any small amounts of unconverted material or large particles of foreign material can be withdrawn from the bottom of the reactor. However, in order to prevent accumulation of excessive amounts of unreacted material it is preferred that at least about 98% of the material should be convertible to carbon disulfide. Until my reactive carbon above described was discovered, it was impractical to employ a fluidized operation for this reaction. The type of reactor herein employed does not permit ready separation of unreacted material from material undergoing reaction, unless as in the case of the ash, it is blown out of the system. Otherwise, because of the fluidized boiling effect that is taking place, the unreacted material is continuously mixed with reactive material and therefore gradually accumulates to the point where the entire reactor would have to be cleaned out and fresh carbon material employed.

The present invention provides a process by which the sulfo-hydrocarbons as well as sulfocarbons, both defined above, can be employed. The sulfur obtained by virtue of the dehydrogeneration of the sulfo-hydrocarbon by evolution of hydrogen sulfide can be recovered therefrom and recycled.

The reactor 8 can be lined with sulfur- and heat-resistant brick, for example those having high thermal conductivity. If additional heat is needed it can be supplied by burners external to the reaction zone, or by passing heated gases into an annular jacketing of the reactor.

Several typical examples of this invention are illustrated below.

*Example I*

A sulfocarbon having the chemical composition of 84% carbon, 1% hydrogen and 15% sulfur was introduced into the reaction zone with sulfur preheated to 1400° F. The particle size of the initially fed sulfocarbon was between 40-100 mesh. A gaseous linear velocity under reaction conditions of 1 foot per second was maintained. The ratio of sulfur to sulfocarbon introduced was 5 to 1 by weight. It was observed that substantially complete conversion of the sulfocarbon took place with a volumetric analysis of the gases leaving the reaction zone of 13.5% elemental sulfur (based on atomic weight of sulfur), 10.8% hydrogen sulfide and 75.7% carbon disulfide. These gases were cooled and substantially all unreacted sulfur separated as a liquid at 300° F. to be vaporized again and recycled to the reaction zone. The remaining gases were fractionated into two relatively pure streams of hydrogen sulfide and carbon disulfide respectively. The hydrogen sulfide was passed to a sulfur recovery section and the recovered elemental sulfur recycled as part of the sulfur charged to the reaction zone. The carbon disulfide produced was 99.9% pure and capable of being used for high tenacity rayon manufacture, etc. The yield of carbon disulfide based upon the carbon originally present in the sulfocarbon was 98%.

*Example II*

A sulfohydrocarbon having the composition of 60% carbon, 3% hydrogen and 37% sulfur having a particle size range of 8-20 mesh was introduced into the fluidized reaction zone with sulfur preheated to 1600° F. The linear gas velocity at reaction temperature was 1.8 feet per second. The mass ratio of sulfur to sulfohydrocarbon employed was 4.31. Substantially complete conversion of sulfohydrocarbon took place. The off gases consisted of the following analysis calculated upon a mass basis.

| | Percent |
|---|---|
| Hydrogen sulfide | 9.6 |
| Carbon disulfide | 71.4 |
| Sulfur | 19.0 |

The gaseous reaction products were cooled and the unreacted sulfur separated as a liquid at 300° F. to be vaporized again and recycled to the reaction zone. The remaining gases were separated into relatively pure hydrogen sulfide and carbon disulfide. Elemental sulfur was recovered from the hydrogen sulfide stream and recycled for reuse in the process. A yield of carbon disulfide based upon the carbon originally present in the sulfohydrocarbon of 95% was obtained. The carbon disulfide produced was 99.94% pure and capable of being employed in the manufacture of xanthates, carbon tetrachloride, high tenacity rayon, as an industrial solvent etc.

I claim as my invention:

1. A process for producing carbon disulfide which comprises introducing sulfur vapor and a finely reactive carbon composition comprising sulfur, carbon and hydrogen in chemical combination into a reaction zone maintained at 1100–1800° F., the carbon of said composition being capable of being converted to carbon disulfide to the extent of at least 95%, maintaining the composition in fluidized condition by means of sulfur vapor, vapors formed during the reaction, and gases introduced as hereinafter set forth under conditions of gas velocity to form a dense phase and a light phase of suspended particles in said reaction zone, separating vapors containing carbon disulfide, elemental sulfur and hydrogen sulfide, removing solids therefrom, cooling the vapors to condense the sulfur as a liquid, separating and recycling the liquid sulfur, recovering the carbon disulfide from the substantially sulfur free vapors, converting hydrogen sulfide in the vapors from the last named step into elemental sulfur, and passing at least a portion of the resulting gas to the reaction zone to assist in maintaining the particles of said carbon composition in fluidized form as above set forth.

2. The process of claim 1 wherein the solid substance is a sulfohydrocarbon.

3. The process of claim 1 wherein the solid substance is a sulfocarbon.

4. A process for producing carbon disulfide which comprises introducing sulfur vapor and particles of a reactive carbon composition into a reaction zone maintained at 1100–1800° F., said composition comprising sulfur, carbon and hydrogen in chemical combination, the carbon in said composition being capable of conversion to carbon disulfide to the extent of at least 95%, maintaining the flow of vapors in said zone at a rate sufficient to maintain the particles in fluidized suspension by introducing gases as hereinafter set forth, separating vapors containing carbon disulfide, elemental sulfur and hydrogen sulfide, removing solids therefrom, cooling the vapors to condense liquid sulfur therefrom, recycling the recovered sulfur, recovering carbon disulfide from the substantially sulfur free vapors, converting hydrogen sulfide in the vapors from the last named step into elemental sulfur, and passing at least a portion of the resulting gas to the reaction zone to maintain a fluidizing vapor velocity therein as above set forth.

5. The process of claim 4 wherein the vapor velocity in the reaction zone is about 1–20 linear feet per second.

6. The process of claim 4 wherein the vapor velocity in the reaction zone is about 1–10 linear feet per second.

7. The process of claim 4 wherein the linear vapor velocity in the reaction zone is about 5–10 feet per second.

BERNARD WM. GAMSON.

REFERENCES CITED

The following references are of record in the file of this patent:

UNITED STATES PATENTS

| Number | Name | Date |
|---|---|---|
| 2,234,769 | McCulloch | Mar. 11, 1941 |
| 2,248,509 | Parsons | July 8, 1941 |
| 2,330,934 | Thacker | Oct. 5, 1943 |
| 2,443,854 | Ferguson | June 22, 1948 |
| 2,447,003 | Gamson | Aug. 17, 1948 |